United States Patent [19]
Matouka et al.

[11] Patent Number: 5,026,125
[45] Date of Patent: Jun. 25, 1991

[54] PRESSURE ACTUATOR

[75] Inventors: Michael F. Matouka, Utica; Robert J. Hammersmith, Rochester Hills, both of Mich.

[73] Assignee: General Motors Corporation, Detroit, Mich.

[21] Appl. No.: 398,685

[22] Filed: Aug. 25, 1989

[51] Int. Cl.$^5$ .................................................. B60T 8/32
[52] U.S. Cl. .................................... 303/100; 188/162; 303/93; 303/113; 303/115; 303/119
[58] Field of Search .................... 74/411; 188/162; 303/93, 100, 110, 119, 113, 115; 192/56 R; 180/197

[56] References Cited

U.S. PATENT DOCUMENTS

| | | | |
|---|---|---|---|
| 2,537,672 | 1/1951 | James | 192/56 R X |
| 3,090,258 | 5/1963 | Zink et al. | 74/411 X |
| 3,420,580 | 5/1967 | Dymond | 303/21 |
| 3,549,210 | 2/1969 | Birge et al. | 303/21 |
| 3,790,225 | 2/1974 | Wehde | 188/162 X |
| 4,327,414 | 4/1982 | Klein | 188/162 X |
| 4,927,212 | 5/1990 | Harrison et al. | 303/115 |

Primary Examiner—Douglas C. Butler
Attorney, Agent, or Firm—Ernest E. Helms

[57] ABSTRACT

A pressure actuator for a vehicle braking system is provided. The actuator has a frame with fluid connections with a pressurized fluid source and a wheel cylinder. A piston is slidably mounted inside an interior bore of the frame. A nut is associated with the piston for moving the piston. A drive screw is threadably engaged with the nut. A motor is provided for powering the drive screw in response to a signal given by a controller. A gear train is provided having at least one gear connected with the first drive screw and another gear being connected with the motor for transmitting torque from the motor to the first drive screw. One of the gears has an inner hub and an outer ring with a spring device preventing relative motion between the hub and the ring unless a predetermined torque value is exceeded whereby the hub has angular rotation with respect to the ring.

10 Claims, 5 Drawing Sheets

PRESSURE ACTUATOR

FIELD OF THE PRESENT INVENTION

The field of the present invention is that of anti-lock braking systems (ABS) and traction control (TC) fluid pressure actuators.

DISCLOSURE STATEMENT

Some ABS and TC pressure actuators have a motor controlled by a controller. The motor is gearably connected with a driving member or power screw by a gear train. Threadably mounted on the power screw is a nut operatively associated with a piston. The piston (via the nut) is translated by the power screw within a linear bore of the actuator frame. When the piston reaches the end of its travel (in either direction), it forces the motor to stop spinning.

High forces are generated by the motor inertia when the piston reaches its end of travel and stops the motor. This is particularly evident since on some occasions the motor can travel at speeds up to 5,000 rpm. The impact forces vary as the square of the motor speed and at a maximum motor speed are considerably higher than those produced by the maximum brake pressure and motor stall torque. If the above noted forces are allowed to occur, damage could possibly occur to the actuator.

Belleville washers can be installed to cushion the piston at its lower end of travel. However, Belleville washers convert the motor's kinetic energy into potential energy as they are compressed, giving rise to a tendency to bounce back. Additionally, the washers take up space in the chambers, lengthening the lengthwise dimension of the actuator. Additional Belleville springs are difficult to implement in the upper end of the piston actuator Therefore, there is a reliance on fluid pressure to slow down the piston and motor before the piston reaches its end of travel at the upper end. Still another approach, to avoid the high stress forces generated by inertia when the piston reaches its end of travel, is to reduce the motor speed by reducing the applied voltage through a pulse-width-modulation technique. The pulse width modulation technique creates difficulty in hardware and also software programming.

DISCLOSURE STATEMENT

To provide an alternative to the above mentioned techniques of reducing the stress forces generated by motor inertia when the piston reaches its end-of-travel and stops the motor the present invention is brought forth. The present invention provides one gear in the gear train, preferably the largest gear, with two concentric halves. During normal operation the two concentric halves of the gear are locked together as one and transmit the full rated motor torque in either direction of rotation. The high torque that exists at the end of travel causes the two gear halves to slip with respect to one another until the motor stops spinning. The slipping occurs at a pre-designed safe torque level and thus limits the corresponding forces throughout the actuator to a safe level.

An advantage of the present pressure actuator is that it dissipates the motor's kinetic energy in sliding friction and thus there is not any piston bounce-back problem. Also the entire piston chamber length is available for pressure modulation and the piston and motor are free to move at maximum speed over the entire length for maximum braking (pressure) response.

Torque limiters, otherwise known as slip clutches, are widely and commonly used but no prior existing limiters were found which allow a pressure actuator according to the applicant's invention. Typically, prior torque limiters were too large, complex or costly. The present invention in a preferred embodiment provides an advantageous pressure actuator in that the torque limiter is small, taking up no additional space in any direction, is simple and inexpensive to build, and is interchangeable with existing gears and can be produced with different torque limit values.

It is an object of the present invention to provide a braking system ABS or TC pressure actuator.

Other objects and advantages of the present invention can become more apparent to those skilled in the art as the nature of the invention is better understood from the accompanying drawings and a detailed description.

DETAILED DESCRIPTION OF THE DRAWINGS

Figure 1:
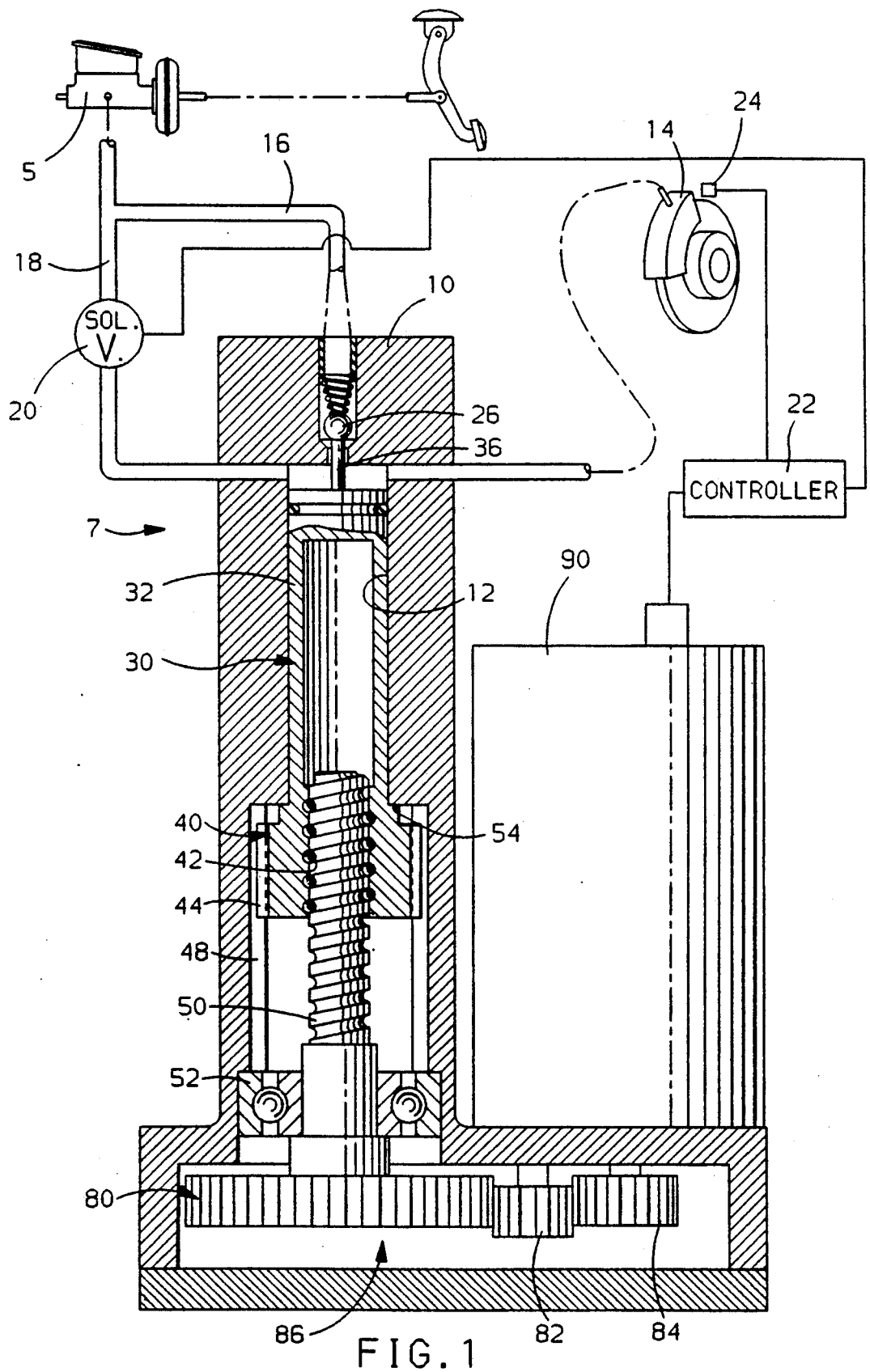
FIG. 1 is a sectional view of a preferred embodiment pressure actuator according to the present invention.
Figure 2:
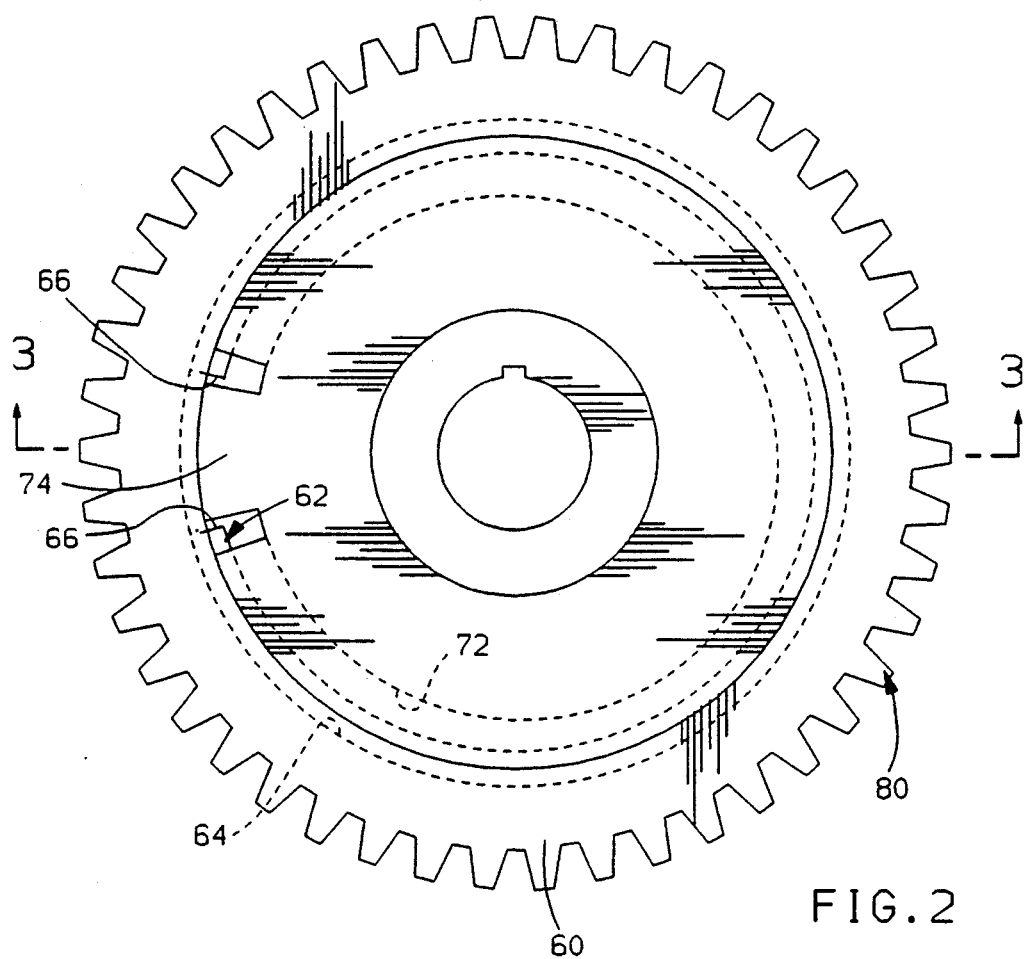
FIG. 2 is a top plan view of the gear torque limiter utilized in the actuator described in FIG. 1.
Figure 3:
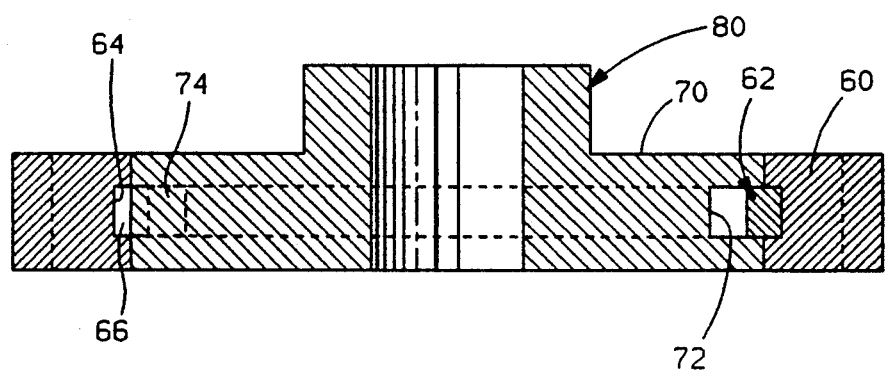
FIG. 3 is a view taken along the line 3—3 of FIG. 2.

Referring to FIG. 1-3, a pressure actuator 7 has a frame 10 having a central longitudinal interior multidiametered bore 12. The longitudinal bore 12 is fluidly connected or exposed to a wheel brake cylinder(s) 14. The bore 12 is also fluidly exposed to a pressure source or master cylinder 5 via lines 16 and 18. A solenoid valve 20 is provided to isolate the brake cylinder 14 from the master cylinder 5 when a controller 22 signals or activates the actuator 7 into an ABS or TC mode. The controller 22 is cognizant of the wheel speed condition via a sensor 24.

Actuator 7 is shown in a preferred embodiment configuration for an ABS actuator by providing a secondary fluid path between the master cylinder 5 and bore 12 via line 16 and check valve 26. Actuator 7 could still function in an ABS system or as a TC system by the removal or plugging of line 16.

Figure 9:
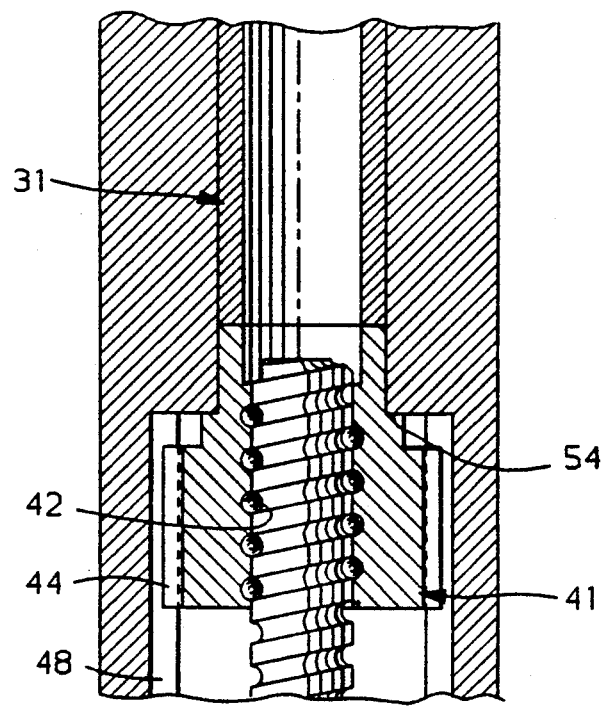
FIG. 9 is a partial cutaway sectional view of an alternate embodiment of the pressure actuator shown in FIG. 1.

Slidably mounted within the central bore 12 of the actuator frame 10 is a piston 30. The piston has a head portion 32 which seals the bore 12. Operatively associated with and optionally integrally joined to the piston 30 is a nut 40 with an interior threaded portion 42. The nut 40 has a flange portion 44 which interacts with a length wise groove 48 of actuator frame 10 to prevent rotative movement of the nut 40. FIG. 9 illustrates an actuator wherein a piston 31 is not joined to but is contacted by a nut 41. This configuration has sometimes been found to be preferable in ABS systems.

Threadably engaged with the interior of the nut is a first driving member commonly referred to as the drive screw 50. The drive screw 50 is mounted within the bore 12 of the actuator frame 10 and is supported at its lower end by a bearing pack 52. Rotation of the drive screw 50 allows for translational movement of the nut 40.

Connected with the drive screw 50 is a large gear 80. The large gear 80 is part of a drive train 86 with two other gears 82, 84. Optional gear 82 can be eliminated if desired. The drive train 86 allows the transmittal of torque to the drive screw 50 from a reversible dc motor 90 which powers the drive screw 50. The motor powers the drive screw in response to signals given to it by the controller 22. The controller receives a signal from the wheel sensor 24 which senses wheel speeds. The controller 22 then computes desired response to the braking system and signals the motor in response thereto in a manner as described in commonly assigned U.S. Pat. No. Agarwal et al 4,761,741 or similar fashion.

In normal operation the piston 30 will be at its upper extreme end and an extended rod 36 of the piston will unseat the check valve 26. Since the solenoid valve 20 is normally open, flow from the master cylinder 5 can reach the wheel cylinder 14 either through the check valve 26 or through the solenoid valve 20.

When an ABS condition is signaled by the controller 22, the solenoid valve 20 will close isolating the master cylinder 5 from the wheel cylinder 14 along the path 18. The motor 90 will be actuated to reverse the nut 40, removing the rod 36 from the check valve 26 therefore closing the same and lowering the fluid pressure delivered to the wheel cylinder 14 by exposing the fluid within the wheel cylinder 14 to a greater volume. On a reapply cycle the motor 90 will reverse and will drive the nut 40 towards its extreme upward position. When the controller senses that brake pressure should now be held, the motor 90 will stop. Later the motor 90 will reverse upon the next desired dump cycle. The second reapply cycle will typically not be as extreme as the first reapply cycle and this will continue until ABS condition is eliminated and the motor 90 will then again rotate the drive screw 50 to position the piston 30 at the upward extreme position reopening the check valve 26. The solenoid valve 20 will also be signaled to an open position. When this occurs the shoulder on the piston typically hits against an interface 54 between the large and small diameters of the bore 12. The nut 40 will instantly stop with the exception of some spring loading into the frame 10, in general causing a torque spike throughout the gear train 86 to the dc motor 90.

To eliminate or minimize the torque spike the larger gear 80 is divided into two concentric elements (FIGS. 2 and 3). The outer ring 60 has an annular groove 64. The hub 70 has a matching annular groove 72 with the exception of a generally radial shaped drive tab 74. Captured within the annular grooves 64, 72 of the ring and hub is a spring means 62. The spring 62 is fabricated from a rectangular cross sectional rod of spring steel which in its pre-installed free shape is shaped generally circular like the letter "C" with a gap of approximately 80° and a diameter larger than the groove 64. During installation, the spring is compressed down into the hub 70 and the two are then inserted into the ring 60. The spring then expands into groove 64 and is compliantly biased to engage with the ring 60, locking the ring 60 and hub 70 together. The spring 62 and ring 60 are now connected together by friction engagement which is proportional to the outward spring force which is proportional to the spring stiffness and the difference between the spring's relaxed (free) diameter and installed diameter.

The spring 62, in its relaxed shape, is not exactly circular but has a somewhat cardioid shape. The cardioid shape results in uniform outward (radial) pressure exerted by the spring on groove 64 and prevents the spring ends 66 from having tendency to dig into the annular groove 64 of the outer ring 60.

The annular capturing grooves 64, 72 of the hub and the ring delete the need of a flange to capture the spring 62 in position and allow the large gear 80 to have no increase in its axial dimension. Upon rotation the hub 70 will rotate freely until the drive tab 74 hits the spring end 66, thus bringing the ring 60 along with it. The above small amount of back lash (due to the clearance between the spring ends 66 and the drive tab 74) will not upset the operation of the actuator 7.

Upon application of torque exceeding a predetermined value, the spring 62 will frictionally slide with respect to the ring 60 and thus limit the transmitted torque to safe value.

The above principle will also work in reverse when the nut 40 is brought down to its extreme lower position.

Referring back to FIG. 1, the advantage of the present pressure actuator 7 can be shown in that cushioning members (such as Belleville washers) between the nut and the bearing 50 or frame 10 can be minimized and or eliminated. Therefore for a given height of the actuator 7 the piston 30 (nut 40) travel can be maximized. This is essential due to the spatial limitations in vehicles brought about by the compaction of the engine space resultant of the corporate fuel economy standards.

Since torque transfer is limited, the motor 90 can operate at maximum speed without having to slow down towards the extreme ends of piston travel in order to minimize the impact forces Also, since slippage is employed there is no bounce back effect or accompanying oscillation or stored spring forces A torsional spin or damping device would be more susceptible to fatigue loading or wear or could place angular rotative limitations on portions of the gear train 86, drive screw 50 or motor 90.

Figure 4:
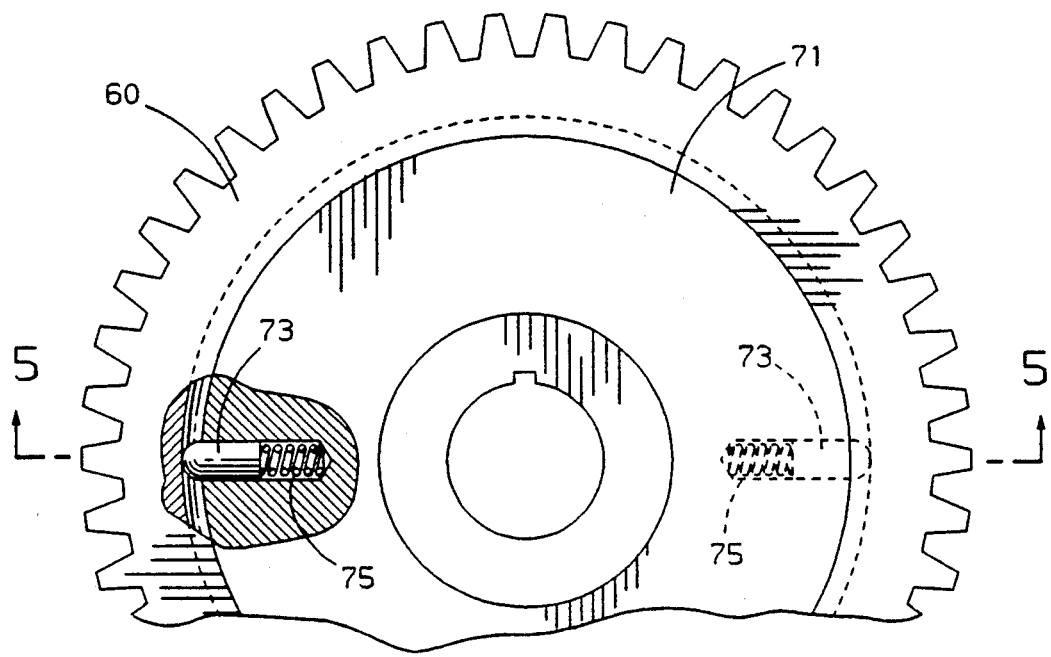
FIG. 4 is a top plan view of a gear torque limiter provided as an alternative to the embodiment illustrated in FIGS. 2 and 3.
Figure 5:
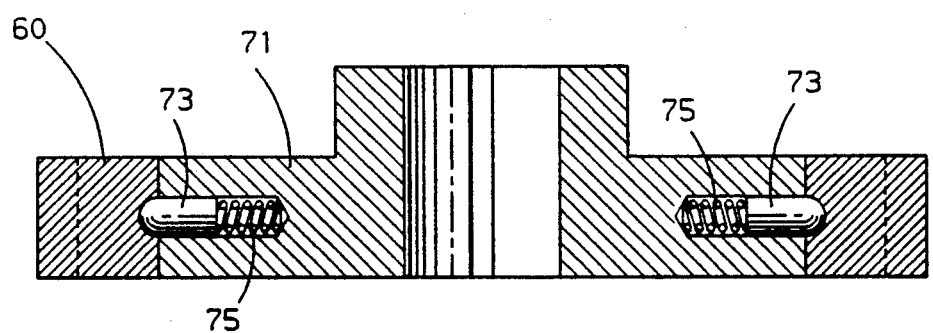
FIG. 5 is a view taken along line 5—5 of FIG. 4.

In an alternative embodiment of the present invention (FIGS. 4 and 5) there are a plurality of spring 75 biased bullets 73 mounted within the hub 71 which project radially outward and engage the ring 60. It is apparent to those skilled in the art that the bullets 73 could be mounted in the ring 60 and pointed towards the hub 71, however, from a manufacturing and operational standpoint, mounting the bullets 73 to the hub 71 is preferable Also, mounting the bullets 73 to the hub 71 allows the contact surface of the bullet to be at the greatest radial distance therefore minimizing the biasing force required of the springs 75.

Figure 6:
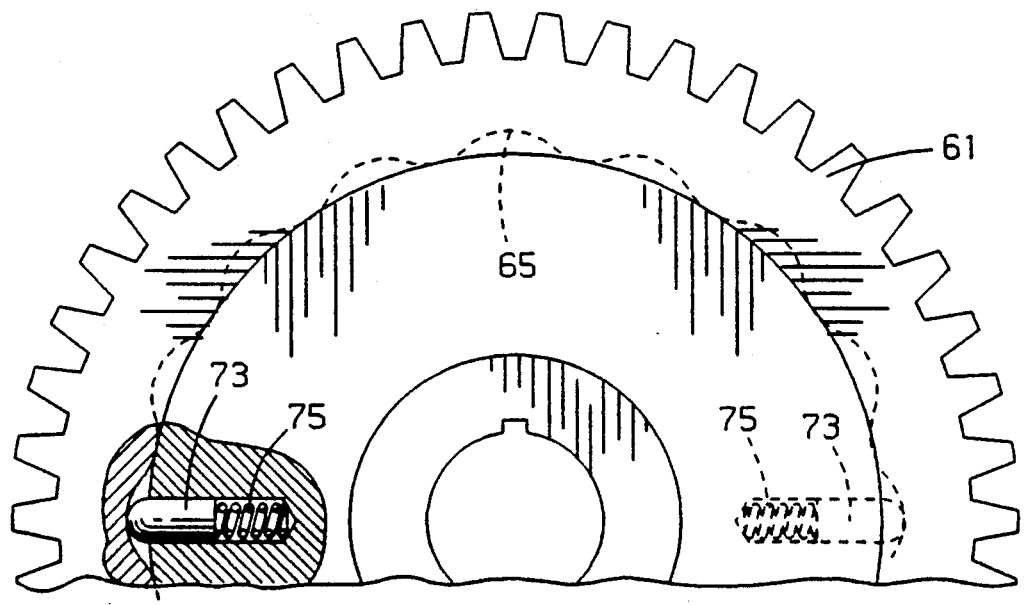
FIGS. 6, 7 and 8 illustrate alternate preferred embodiments of the gear torque limiter.

A radial wave-like sinusoidal pattern 65 (FIG. 6) can be utilized on the groove within the ring. The above allows the torque slippage to be adjusted by changing the ring 61 and providing a new ring with a different sinusoidal groove pattern.

Figure 7:
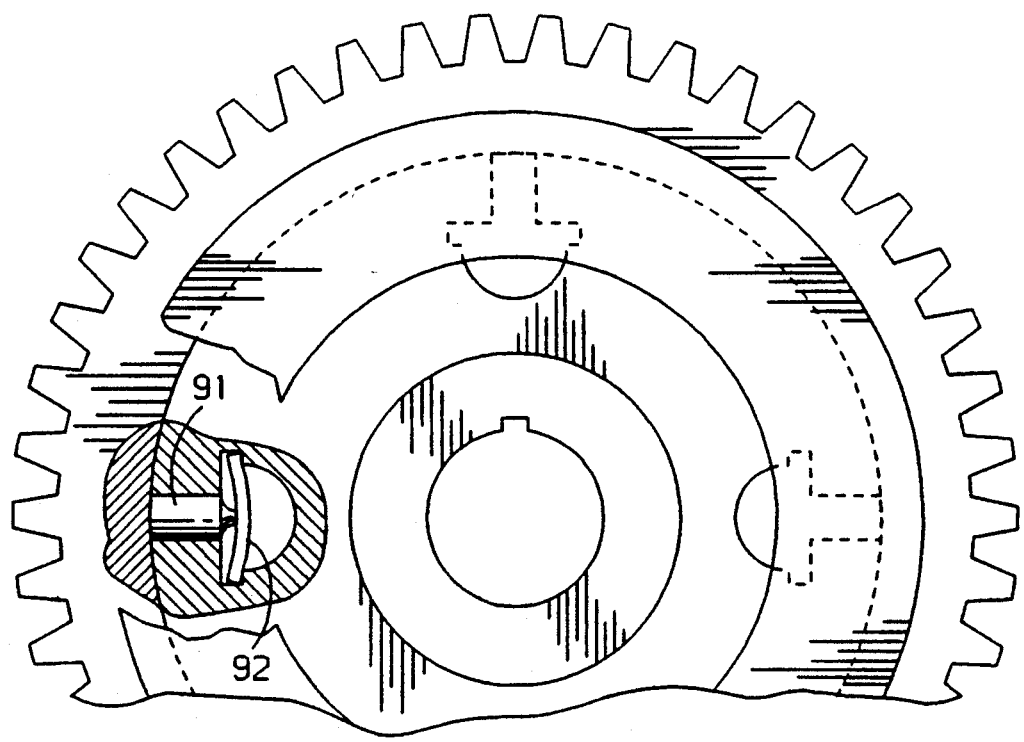

Referring to FIG. 7 another alternative embodiment of the actuator provides a bullet 91 or pin spring biased by a leaf spring 92. This design allows more servability to parts and again torque values may be easily modified by changing of given leaf springs with different spring values.

Figure 8:
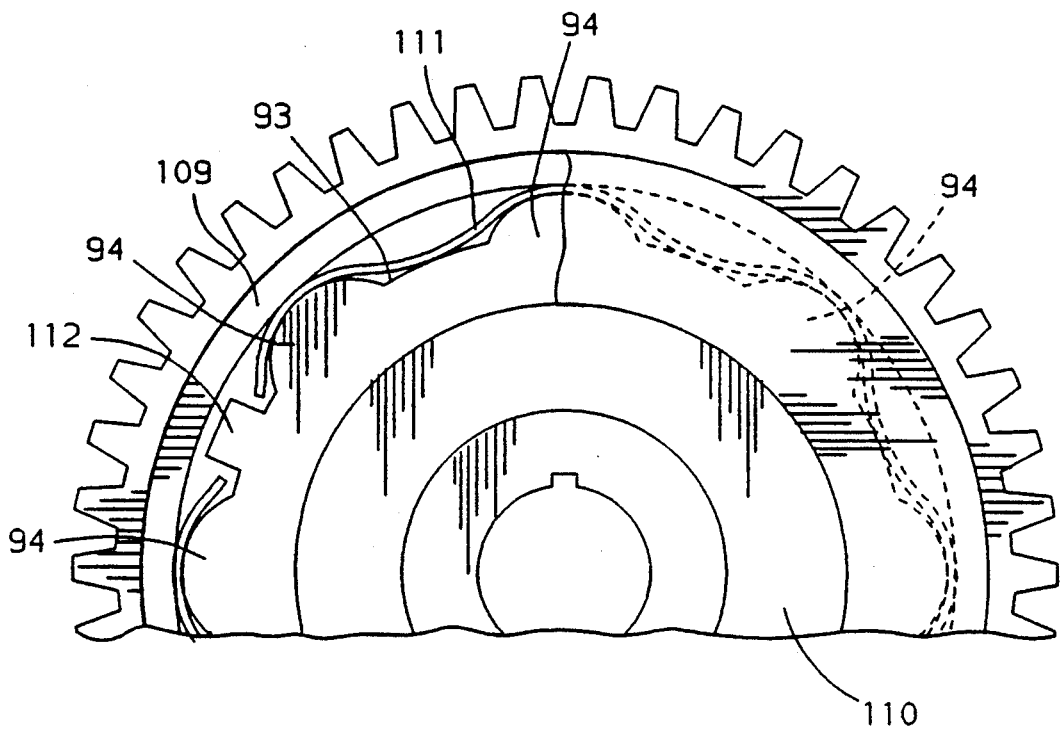

Referring to FIG. 8 still another design provides a daisy wheel hub with a sinusoidal daisy wheel type spring. The ring 109 is positioned on the hub 110 by contact with the lobes 94 through the spring 111 thickness. The outward spring force is created by the hub valleys 93 compressing the spring 111. The torque is transmitted to the spring 111 primarily by the lobes 94, but can be transmitted by the tab 112 which also keeps the spring 111 properly positioned on the lobes 94.

FIG. 9 illustrates an embodiment of the present invention wherein the nut 41 is not integral with the piston 31 but instead has a top surface for contacting the piston 31.

While various embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A pressure actuator for a vehicle braking system including a pressurized fluid source and a wheel brake cylinder fluidly connected with said actuator, and a controller for signaling said actuator, said actuator in combination comprising:
   a frame with an interior bore with fluid connections with said pressurized fluid source and said wheel cylinder;
   a piston slidably sealably mounted within said interior bore;
   a nut operatively associated with said piston for moving said piston;
   a first driven member threadably engaged with said nut for translating said nut within said interior bore;
   a motor for powering said driven member in response to a signal given by said controller; and
   a gear train having at least two gears, one of said gears being torsionally connected with said first driven member and another said gear being torsionally connected with said motor for transmitting torque from said motor to said first driven member, at least one of said gears having an inner hub element and an outer ring element, one of said elements having a generally radial tab, and said gear having a generally circular spring means captured between said hub element and said ring element being compliantly biased to engage and join itself to said other element than said element with said tab, said radial tap making contact with said spring means for transmitting torque between said ring and said hub, and said spring means preventing relative motion between said hub and said ring unless a predetermined torque value is experienced whereby said hub has angular rotation with respect to said ring, and said spring means has sliding frictional engagement with said element said spring means is engaged with moving in a radially aligned manner with said element having said hub.

2. A pressure actuator as described in claim 1 wherein said nut is fixably connected with said piston.

3. A pressure actuator as described in claim 2 wherein said actuator is a traction control system actuator.

4. A pressure actuator as described in claim 1 wherein said nut has a surface for contacting said piston.

5. A pressure actuator as described in claim 1 wherein said actuator is an anti-lock brake system actuator.

6. An actuator as described in claim 1 wherein said spring means fits within an annular groove of said hub and said ring.

7. An actuator as described in claim 1 wherein said spring means is radially wave type shape and said hub has geometrically spaced peaks fitting within the sinusoidal peaks of said spring contacting said outer ring in a daisy wheel like pattern.

8. An actuator as described in claim 1 wherein said tab is joined to said hub.

9. An actuator as described in claim 8 wherein said spring means in its free state is generally cardioid in shape.

10. A pressure actuator for a vehicle anti-lock braking system including a master cylinder and a wheel brake cylinder fluidly connected with said actuator, and a controller for signaling said actuator, said actuator in combination comprising
   a frame with an interior bore with fluid connections with said master cylinder and said wheel cylinder;
   a piston with portion slidably sealably mounted within said interior bore, a nut associated with and contacting said piston for moving said piston, said nut having a threaded portion;
   a drive screw threadably engaged with said nut for translating said nut within said interior bore by rotation of said drive screw;
   a motor for powering said drive screw in response to signals given by said controller; and
   a gear train having at least first and second gears, said first gear being connected with said drive screw and said second gear being connected with said motor for transmitting torque from said motor to said drive screw, said first gear having an inner hub and an outer ring with aligned concentric annular grooves, said hub having a generally radial tab, and within said annular groove is a spring fitted therein connecting said hub to said outer ring having ends for contact with said tab, said spring preventing relative motion between said hub and said ring unless a predetermined torque value is exceeded whereby said hub has angular motion with respect to said ring

* * * * *